Nov. 5, 1957 — O. B. HARMES — 2,811,903
FACING TOOLS
Filed April 17, 1953 — 2 Sheets-Sheet 1
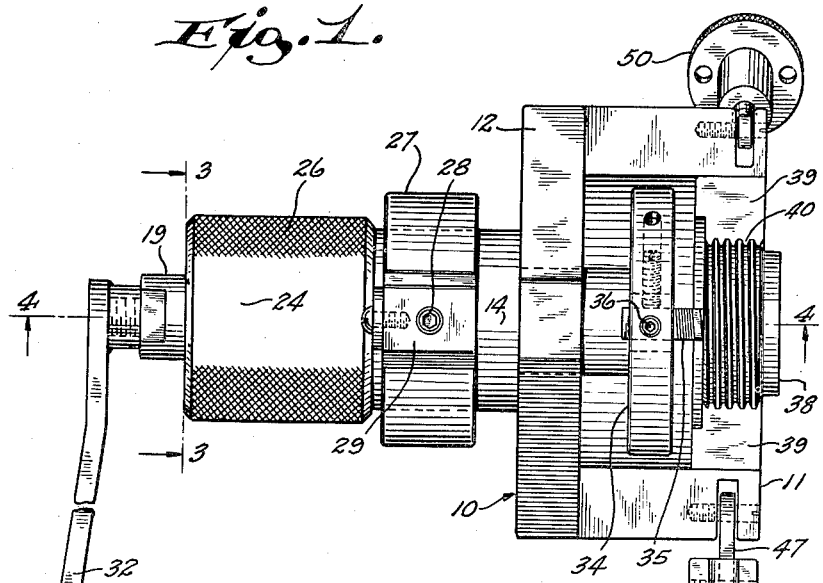
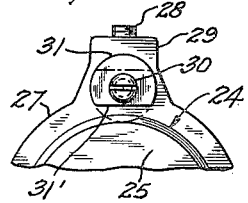
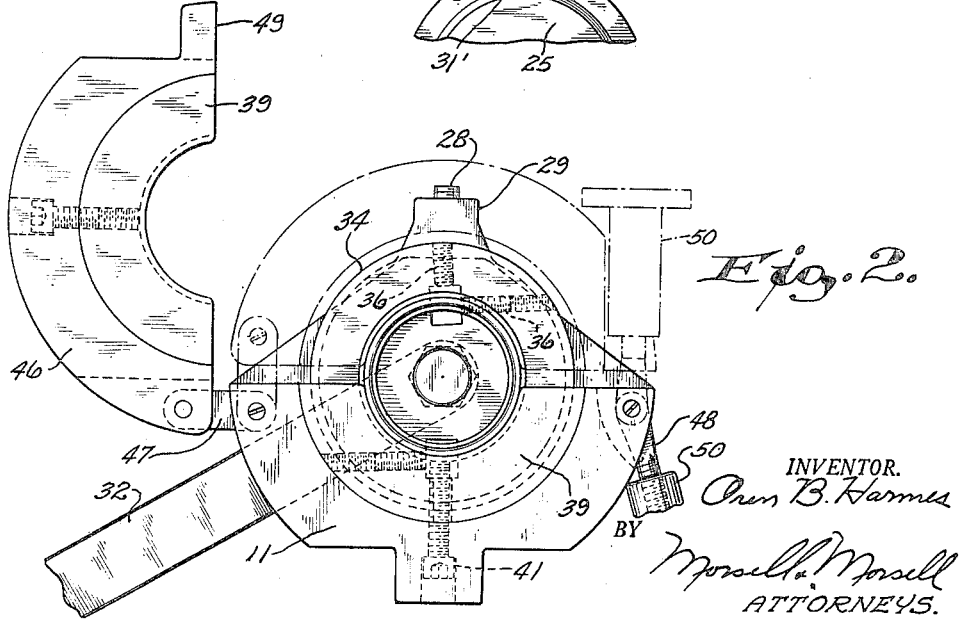
INVENTOR.
Oren B. Harmes
BY Morsell & Morsell
ATTORNEYS.

Nov. 5, 1957  O. B. HARMES  2,811,903
FACING TOOLS
Filed April 17, 1953  2 Sheets-Sheet 2

INVENTOR.
Oren B. Harmes
BY
Morsell & Morsell
ATTORNEYS.

United States Patent Office 2,811,903
Patented Nov. 5, 1957

2,811,903

FACING TOOLS

Oren B. Harmes, Algona, Iowa, assignor, by direct and mesne assignments, to Livingston Tool Company, Algona, Iowa, a copartnership, and Ladish Co., Cudahy, Wis., a corporation of Wisconsin Application April 17, 1953, Serial No. 349,486

5 Claims. (Cl. 90—12)

This invention relates to improvements in facing tools and more particularly to a portable device for performing a special facing operation on an annular end of a pipe section or fitting.

In pipe line installations, such as those used in dairy plants where there are disconnectable joints, it is desirable to have a portable tool which can be used on the job to operate on the annular end faces which form the joints.

A general object of the present invention is to provide a portable machine which is capable of quickly clamping and holding a selected type of tubular end fitting in proper position, and which is capable of quickly performing a facing or refacing operation on the annular end of one of said fittings.

A further object of the invention is to provide a machine wherein the tool holder is constructed to receive and hold a cutting member at a selected distance from the center depending upon the diameter of the fitting which is to be faced.

A still further object of the invention is to provide a facing tool having improved means for feeding the tool inwardly while the cutting is being performed, and having a novel type of gauge member for stopping the feed movement after a cut of predetermined depth has been made.

A further object of the invention is to provide a facing tool which is relatively simple and inexpensive in construction, which is compact, and which is otherwise well adapted for the purposes described.

With the above and other objects in view, the invention consists of the improved facing tool, and all of its parts and combinations, as set forth in the claims, and all equivalents thereof.

In the accompanying drawings, illustrating one complete embodiment of the preferred form of the invention, in which the same reference numerals designate the same parts in all of the views:

Fig. 1 is a top view of the improved facing tool showing the fitting-holding yoke swung to open position;

Fig. 2 is an elevational view looking at the right hand end of the tool of Fig. 1, the fitting-holding yoke being shown in open position by full lines and in closed position by dot and dash lines;

Fig. 3 is a fragmentary view showing a portion of the feed nut and gauge, the rotatable gauge piece being shown by full lines in a position where it does not interfere with movement of the nut, and by dot and dash lines in a position where it forms a stop for the feed nut;

Figure 4:
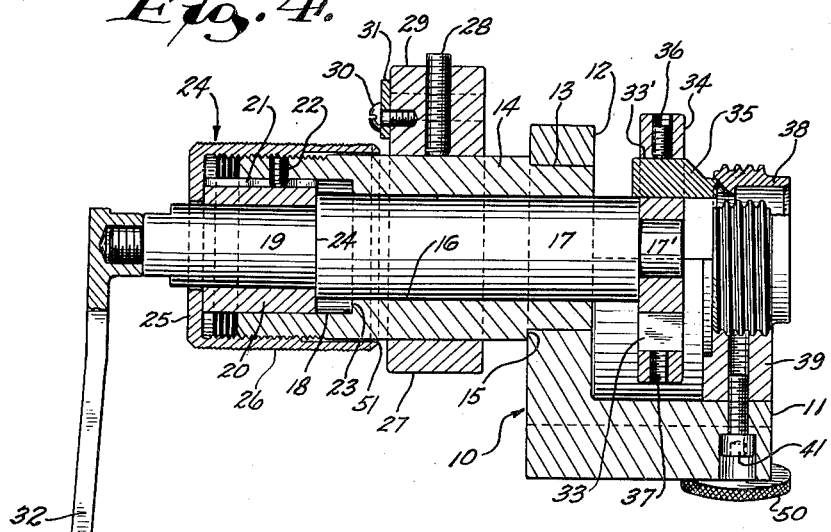
Fig. 4 is a sectional view taken along the line 4—4 of Fig. 1, part of the pipe fitting which is being cut being shown in full and part being shown in section.

Referring more particularly to the drawings, the numeral 10 designates a suitable frame having a substantially semi-cylindrical portion 11, and having a back wall 12 formed with a bore 13. A tubular sleeve 14, having an external annular shoulder 15 is fitted into the bore 13 with the shoulder 15 abutting the outer face of the wall 12. The sleeve 14 has a main bore 16 which forms a bearing for a shaft 17, and has a counterbore 18 near its outer end.

The inner end of the shaft 17 is of reduced diameter, as at 17', and suitably fixed to said end to rotate concentrically therewith is a tool holding wheel 34. At the opposite end of the shaft 17 is a portion 19 of reduced diameter. Surrounding the portion 19 is a bushing 20, the exterior diameter of the bushing being such as to fit the counterbore 18. The exterior of the bushing 20 has an axially extending slot 21 which is engaged by the lower end of a screw 22, the screw preventing rotation of the bushing 20 while permitting longitudinal movement of the bushing toward and away from the annular shoulder 23 which is between the main bore 16 and counterbore 18. The inner end of the bushing 20 is normally in engagement with the shaft shoulder 24 which is formed between the main portion of the shaft 17 and the portion 19.

Threaded on the exterior of the sleeve 14 is a feed nut 24. This nut has an annular flange 25 which loosely surrounds the shaft portion 19, and which engages the outer end of the bushing 20. The feed nut may have a knurled exterior as at 26.

It is apparent that when the feed nut 24 is rotated inwardly its flange 25 will act to push the bushing 20 axially inwardly. At the same time the inner end of the bushing will act on the shoulder 24 of the shaft 17 to urge the shaft and, hence, the tool holding wheel 34 toward the work.

A gauge member or collar 27 is slidably mounted on the exterior of the sleeve 14 between the feed nut 24 and the wall 12. A set screw 28 may be turned to lock the gauge collar in a selected position of axial adjustment. The gauge collar has its periphery provided with an extension 29. Pivoted on a screw 30 to that face of the extension 29 which faces the feed nut is a gauge disc or piece 31. This piece has a cut-off peripheral portion 31' and is swingable from the position of Fig. 4 (full line position of Fig. 3) to the dot and dash line position of Fig. 3 where it serves as a stop to limit inward movement of the feed nut 24.

The shaft portion 19 projects rotatably through the end of the nut and may be equipped with a hand crank 32. If desired, the shaft may be equipped so that it can be motor driven.

The tool holding wheel 19 has an outer tool opening 33 and another opening 33' which is nearer to the center of the wheel 19. A cutting tool 35 may be removably held in the opening 33' by means of set screws 36, or it may be removably held in the opening 33 by means of set screws in the threaded set screw holes 37.

When it is desired to operate on the end face of an externally threaded pipe fitting, such as the fitting 38, a semi-cylindrical adapter 39 having internal threading to coact with the threading of the fitting 38 is used. This adapter may be removably held in position by means of a screw 41.

Figure 5:
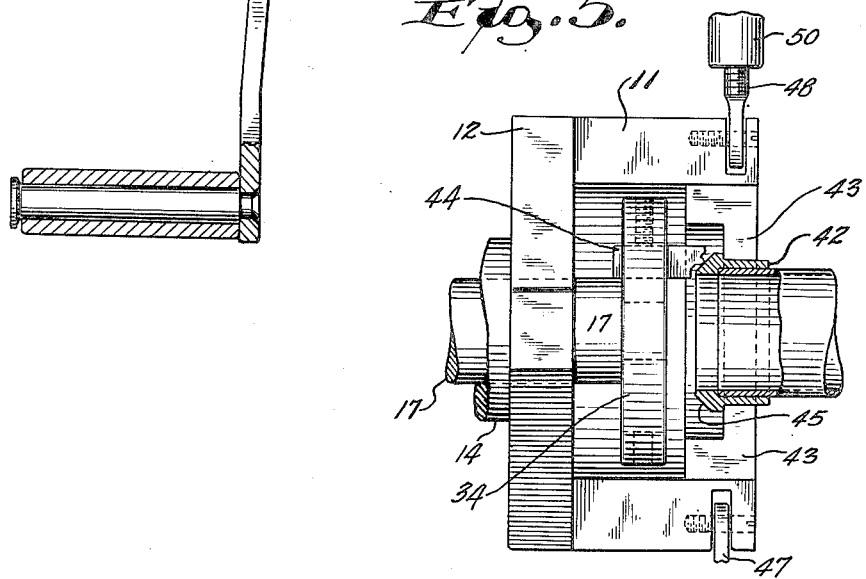
Fig. 5 is a fragmentary top view like part of Fig. 1 showing a different type of fitting-holding adapter with a different fitting and cutter.

If a ferrule or fitting, such as the fitting 42 of Fig. 5 which has a smooth exterior surface, is to be worked on, then a semi-cylindrical adapter 43 (see Fig. 5) which has a smooth bore, is used in lieu of the threaded adapter 39. Fig. 5 shows a different tool 44 inserted in the tool holding wheel for operation on the tapered end face 45 of the ferrule 42.

A yoke 46 is pivoted by means of a link 47 to the lower body portion 11 of the tool. This yoke is adapted to interchangeably receive cooperating adapter pieces like the adapter 39 or like the adapter 43. When the yoke is swung down to the dot and dash line position of Fig. 2 then the pivoted clamping bolt 48 may be swung into engagement with the bifurcated end 49 of the yoke, as shown by dot and dash lines in Fig. 2. Then by turning down the nut 50 the fitting 38 or 42 will be clamped firmly in position for the facing operation.

With the fitting thus clamped, the shaft 17 is pushed axially inwardly by operation of the feed nut until the cutter 35 contacts the work as in Fig. 4. Then, with the set screw 28 of the gauge collar 27 loosened, and with the gauge piece 31 swung down to the dot and dash line position of Fig. 3, the collar 27 is slid toward the feed nut until the gauge piece 31 strikes the end 51 of the feed nut. While in this position, the set screw 28 is tightened. Then the gauge piece 31 is swung to the raised position of Fig. 4 (full line position of Fig. 3). Cutting of the tapered end face of the pipe fitting 38 may then be begun by turning the crank 32. As the crank is being turned with one hand the feed nut 24 is threaded slowly inwardly with the other hand to progressively advance the cutter into the work. This is continued until the end 51 of the feed nut 24 strikes the gauge collar 27. When this occurs the work has been cut to the desired depth.

Various changes and modifications may be made without departing from the spirit of the invention, and all of such changes are contemplated as may come within the scope of the claims.

What I claim is:

1. In a facing tool having a frame, means on said frame for supporting work to be faced, a sleeve in said frame, a shaft journalled in said sleeve and also slidable axially therein toward and away from the work, a tool holder on the inner end of said shaft, a feed nut threaded on said sleeve, means for transmitting feed movement from said feed nut to said shaft as said nut is threaded toward the work, a gauge member mounted for axial movement on said sleeve between said nut and the work support, a gauge disc having a cut-off peripheral portion rotatably mounted on that face of said gauge member which is toward the feed nut for rotation between a position where it can be engaged by said feed nut and a position where the cut-off periphery of said disc permits movement of the feed nut toward the gauge member without interference from said gauge disc, and means for setting the gauge member in a predetermined position on the sleeve with respect to said feed nut.

2. In a facing tool having a frame, means on said frame for supporting work to be faced, a sleeve in said frame and having a main bore, a shaft journalled in said main bore of the sleeve and also slidable axially therein toward and away from the work, a tool holder on the inner end of said shaft, a feed nut threaded on the outer end of said sleeve, said sleeve having a counterbore in its outer end communicating with its main bore, and said shaft having an annular shoulder in the counterbore portion of the sleeve, a bushing on the outer end portion of the shaft slidably positioned in said counterbore and having its inner end engaging said shoulder, said bushing having an axially extending slot in its outer periphery, means on the sleeve projecting into said slot to permit sliding movement of the bushing while preventing rotation thereof, and means on said feed nut engageable with the outer end of the bushing for transmitting feed movement to said bushing and shaft as said nut is threaded toward the work.

3. In a facing tool having a frame, means on said frame for supporting work to be faced, a sleeve in said frame, a shaft journaled in said sleeve and also slidable axially therein toward and away from the work, a tool holder on the inner end of said shaft, feed means movably mounted on said sleeve, means for transmitting feed movement from said feed means to said shaft as said feed means is moved toward the work, a gauge member mounted intermediate the length of said sleeve and shaft for axial movement on said sleeve between said feed means and the work support, a gauge piece rotatably mounted on that face of said gauge member which is toward the feed means for rotation between a position where it can be engaged by said feed means and a position where it is clear of said feed means to permit movement of the feed means toward the gauge member without interference from said gauge piece, and means for setting the gauge member in a predetermined position on the sleeve with respect to said feed means.

4. In a facing tool having a frame, means on said frame for supporting work to be faced, a sleeve in said frame, a shaft journaled in said sleeve and also slidable axially therein toward and away from the work, a tool holder on the inner end of said shaft, feed means movably mounted on said sleeve, means for transmitting feed movement from said feed means to said shaft as said feed means is moved toward the work, a gauge member mounted intermediate the length of said sleeve and shaft for axial movement on said sleeve between said feed means and the work support, a gauge piece of predetermined thickness corresponding to the depth of the cut desired movably mounted on that face of said gauge member which is toward the feed means for movement from a position where it can be engaged by said feed means to a position where it is clear of said feed means to permit movement of the feed means toward the gauge member without interference from said gauge piece, and means for setting the gauge member in a predetermined position on the sleeve with respect to said feed means.

5. In a facing tool having a frame, means on said frame for supporting work to be faced, a sleeve in said frame, a shaft journaled in said sleeve and also slidable axially therein toward and away from the work, said sleeve having an externally threaded outer end portion, a feed nut threaded on the outer end of said sleeve and having an inner end projecting inwardly of the sleeve beyond the threading thereon, means for transmitting feed movement from said feed nut to said shaft as said feed nut is threaded toward the work, a gauge member mounted intermediate the length of said sleeve and shaft for axial movement on said sleeve between said work support and the inner projecting end of said feed nut, a gauge piece of predetermined thickness corresponding to the depth of the cut desired movably mounted on that face of the gauge member which is toward the inner projecting end of the feed nut for movement from a position where it can be engaged by said projecting end of the feed nut to a position where it is clear of the feed nut to leave a space between the inner end of the feed nut and the face of the gauge member, which space permits feed movement until the inner end of the feed nut engages the gauge member, and means for setting the gauge member in a predetermined position on the sleeve.

References Cited in the file of this patent

UNITED STATES PATENTS

| | | |
|---|---|---|
| 629,171 | Radley | July 18, 1899 |
| 1,168,060 | Deppeler | Jan. 11, 1916 |
| 2,032,384 | West | Mar. 3, 1936 |
| 2,053,644 | Tuttle | Sept. 8, 1936 |
| 2,490,371 | Norton | Dec. 6, 1949 |
| 2,499,658 | Livingston et al. | Mar. 7, 1950 |

FOREIGN PATENTS

| | | |
|---|---|---|
| 588,544 | Great Britain | May 27, 1947 |